(12) United States Patent
Martin et al.

(10) Patent No.: US 12,145,213 B2
(45) Date of Patent: Nov. 19, 2024

(54) COATING DEVICE AND METHOD FOR METAL-COATING OF WORKPIECES

(71) Applicant: STURM MASCHINEN- & ANLAGENBAU GMBH, Salching (DE)

(72) Inventors: Carlos Martin, Deggendorf (DE); Roland Baier, Bad Abbach (DE)

(73) Assignee: STURM MASCHINEN- & ANLAGENBAU GMBH, Salching (DE)

( * ) Notice: Subject to any disclaimer, the term of this patent is extended or adjusted under 35 U.S.C. 154(b) by 403 days.

(21) Appl. No.: 17/014,917

(22) Filed: Sep. 8, 2020

(65) Prior Publication Data

US 2021/0069830 A1    Mar. 11, 2021

(30) Foreign Application Priority Data

Sep. 9, 2019 (EP) .................................... 19196156
Sep. 27, 2019 (EP) .................................... 19200059

(51) Int. Cl.
*B23K 26/03*     (2006.01)
*B05B 12/12*     (2006.01)
(Continued)

(52) U.S. Cl.
CPC ............ *B23K 26/032* (2013.01); *B05B 12/12* (2013.01); *B05B 13/0221* (2013.01);
(Continued)

(58) Field of Classification Search
USPC ......... 118/308, 309, 641–643, 313–316, 302
See application file for complete search history.

(56) References Cited

U.S. PATENT DOCUMENTS 5,746,844 A * 5/1998 Sterett .................... B22F 12/00
                                                     427/469
5,800,615 A * 9/1998 Lambert .................. B05B 5/08
                                                     118/309
(Continued)

FOREIGN PATENT DOCUMENTS

CN    104388929 A    3/2015
CN    104928675 A    9/2015
(Continued)

OTHER PUBLICATIONS

An Office Action mailed by the Korean Intellectual Property Office on Nov. 1, 2022, which corresponds to Korean Patent Application No. 10-2020-0113604 and is related to U.S. Appl. No. 17/014,917; with English language translation.
(Continued)

*Primary Examiner* — Yewebdar T Tadesse
(74) *Attorney, Agent, or Firm* — Studebaker & Brackett PC (57) ABSTRACT

The invention relates to a coating device and to a method for metal-coating of workpieces, comprising a housing, which surrounds a working space, a retaining apparatus for retaining at least one workpiece in the working space, at least one deposition apparatus comprising a deposition nozzle for applying a metal powder to the workpiece surface to be coated, and a laser for locally melting the metal powder on the workpiece surface to form a coating, and at least one movement apparatus, by means of which the at least one deposition apparatus can be moved relative to the workpiece surface during the coating. Particularly efficient coating is made possible by at least two deposition apparatuses being arranged in the working space in the housing, which apparatuses are designed to simultaneously apply and melt metal powder.

6 Claims, 6 Drawing Sheets

(51) Int. Cl.
*B05B 13/02* (2006.01)
*B05B 15/50* (2018.01)
*B22F 10/25* (2021.01)
*B22F 10/66* (2021.01)
*B22F 12/45* (2021.01)
*B22F 12/86* (2021.01)
*B22F 12/88* (2021.01)
*B22F 12/90* (2021.01)
*B23K 26/08* (2014.01)
*B23K 26/342* (2014.01)
*B23K 26/354* (2014.01)
*B22F 10/00* (2021.01)
*B22F 12/53* (2021.01)
*B23K 26/12* (2014.01)

(52) U.S. Cl.
CPC .............. *B05B 15/50* (2018.02); *B22F 10/25* (2021.01); *B22F 10/66* (2021.01); *B22F 12/45* (2021.01); *B22F 12/86* (2021.01); *B22F 12/88* (2021.01); *B22F 12/90* (2021.01); *B23K 26/08* (2013.01); *B23K 26/342* (2015.10); *B23K 26/354* (2015.10); *B22F 10/00* (2021.01); *B22F 12/53* (2021.01); *B23K 26/127* (2013.01)

(56) References Cited

U.S. PATENT DOCUMENTS

| | | | | |
|---|---|---|---|---|
| 7,108,894 | B2* | 9/2006 | Renn | B41J 2/435 427/591 |
| 8,267,683 | B2* | 9/2012 | Inoue | A61C 13/0019 118/308 |
| 2006/0272909 | A1 | 12/2006 | Fuller et al. | |
| 2017/0252812 | A1* | 9/2017 | Mykulowycz | B22F 1/08 |
| 2020/0246870 | A1* | 8/2020 | Parrish | B33Y 40/00 |

FOREIGN PATENT DOCUMENTS

| | | |
|---|---|---|
| CN | 107904591 A | 4/2018 |
| EP | 0 661 127 A1 | 7/1995 |
| JP | H06-049656 A | 2/1994 |
| JP | H06-83177 U | 11/1994 |
| JP | H10-098216 A | 4/1998 |

OTHER PUBLICATIONS

An Office Action mailed by China National Intellectual Property Administration on Nov. 23, 2022, which corresponds to Chinese Patent Application No. 202010848453.5 and is related to U.S. Appl. No. 17/014,917; with English language translation.

An Office Action mailed by the Indian Patent Office on Sep. 24, 2021, which corresponds to Indian Patent Application No. 202034036814 and is related to U.S. Appl. No. 17/014,917.

An Office Action mailed by the Japanese Patent Office on Mar. 15, 2022, which corresponds to Japanese Patent Application No. 2020-148723 and is related to U.S. Appl. No. 17/014,917; with English language translation.

An Office Action mailed by China National Intellectual Property Administration on Sep. 25, 2023, which corresponds to Chinese Patent Application No. 202010848453.5 and is related to U.S. Appl. No. 17/014,917; with English language translation.

* cited by examiner

COATING DEVICE AND METHOD FOR METAL-COATING OF WORKPIECES

The invention relates to a coating device for metal-coating of workpieces, comprising a housing, which surrounds a working space, a retaining apparatus for retaining at least one workpiece in the working space, at least one deposition apparatus comprising a deposition nozzle for applying a metal powder to a workpiece surface to be coated, and a laser for locally melting the metal powder on the workpiece surface to form a coating, and at least one movement apparatus, by means of which the at least one deposition apparatus can be moved relative to the workpiece surface during the coating.

The invention further relates to a method for metal-coating of workpieces, in which at least one workpiece is retained in a housing in a working space by means of a retaining apparatus, a workpiece surface is coated by means of at least one deposition apparatus, a metal powder being applied to a workpiece surface to be coated by means of a deposition nozzle of the at least one deposition apparatus and the applied metal powder being locally melted on the workpiece surface by means of a laser of the at least one deposition apparatus, with a metal coating being formed, and the at least one deposition apparatus can be moved relative to the workpiece surface during the coating by means of at least one movement apparatus.

Coating devices and methods of this kind for metal-coating of workpieces are known as so-called laser deposition welding. In this process, a powder is applied to a metal workpiece and is locally melted by means of a laser. The molten metal powder forms a coating on the workpiece surface, which coating can be particularly wear-resistant or corrosion-resistant, in particular. Here, the method is carried out in a closed working space of the coating device.

The object addressed by the invention is to provide a coating device and a method for metal-coating of workpieces, by means of which workpieces can be coated particularly efficiently.

The coating device according to the invention is characterised in that at least two deposition apparatuses are arranged in the working space in the housing, which apparatuses are designed to simultaneously apply and melt metal powder.

A basic concept of the invention can be considered that of increasing the output of the coating device by two or more deposition apparatuses which simultaneously carry out coating being arranged in the working space surrounded by the housing of the coating device.

A preferred embodiment of the invention involves the workpiece surface to be coated being arranged horizontally. The workpiece surface being arranged horizontally in particular allows metal powder to be used particularly economically. This powder can be deposited on the workpiece surface such that it initially remains lying on the horizontally directed workpiece surface. In this position, it can be melted by the laser in a targeted manner.

According to an alternative arrangement of a coating device according to the invention, it is advantageous for the workpiece surface to be coated to be arranged vertically. In a vertical arrangement, in which the workpiece surface is oriented approximately in the direction of gravitational force, excess metal powder is immediately discharged in a downward direction. Therefore, only the metal powder directly melted by the laser remains on the workpiece surface, so that a very precise coating can be achieved.

According to a development of the invention, particularly efficient coating can be achieved by at least two deposition apparatuses being provided, by means of which a coating can be deposited simultaneously on a workpiece. By means of two or more deposition apparatuses which simultaneously coat a workpiece, a particularly short processing time per workpiece can be achieved.

According to a development of the coating device according to the invention, it is particularly advantageous for the workpiece to be disc-shaped or planar and for coating to be carried out on two opposite surfaces. The workpiece may in particular be a brake disc, which comprises a workpiece surface to be coated on both sides, which are coated simultaneously by means of the deposition apparatuses. In principle, also when the workpiece is horizontally arranged, a workpiece surface can be coated simultaneously by preferably two deposition apparatuses which are opposite one another so as to be offset approximately by 180° about a central axis of the workpiece.

According to a development of the invention, it is particularly expedient for the deposition apparatuses to be directly opposite one another and for the coating to be able to be carried out on both sides simultaneously. In particular when the workpiece is oriented vertically, thermal stresses can be applied to either side of the workpiece at least symmetrically to a vertical workpiece plane. As a result, undesired distortion of the workpiece due to asymmetrical heat input can be largely avoided.

Another particularly economical embodiment of the coating device according to the invention involves at least two workpieces being arranged in a working space and each being able to be coated simultaneously by at least one deposition apparatus. In the process, the workpieces can be arranged on separate retaining apparatuses or preferably on a common retaining apparatus, which supports the at least two workpieces together. Here, the retaining apparatus may in particular be arranged on a transport pallet, by means of which the workpieces are transported together into and out of the coating device. By receiving at least two workpieces in one coating device, said device can be utilised particularly effectively, including the required apparatuses for supplying the metal powder and for discharging the unused metal powder.

In principle, the at least one movement apparatus can be arranged in part on the retaining apparatus for the workpiece. Here, the workpiece can be movably, in particular rotatably, mounted on the retainer, the workpiece being set into movement, in particular rotary movement, by the movement apparatus, for example a motor.

A control apparatus is also provided, which controls the movement apparatus and thus the movement of the workpiece on the retaining apparatus and, if necessary, also controls a movement of the deposition apparatus relative to the workpiece.

The method according to the invention for metal-coating of workpieces is characterised in that at least two deposition apparatuses are arranged in the working space in the housing, which apparatuses simultaneously apply and melt metal powder. The method according to the invention can in particular be carried out by the previously described coating device. In the process, the previously described advantages can be achieved.

A preferred variant of the method involves the workpiece surface to be coated being arranged horizontally or vertically during the coating. A horizontal arrangement allows the metal powder to be applied efficiently, while in a vertical arrangement, it is made possible for the unused metal powder to be reliably discharged.

According to another variant of the method, a workpiece can be coated particularly rapidly by at least two deposition apparatuses simultaneously depositing a coating on the workpiece. When the workpiece is arranged horizontally, the deposition apparatuses can be arranged evenly over the circumference of the workpiece.

According to a development of the invention, in particular when a disc-shaped workpiece having two workpiece surfaces to be coated is arranged vertically, it is advantageous for the deposition apparatuses to be directly opposite one another and for coating to be carried out on one side or on two opposite sides of the workpiece simultaneously. When opposite sides are coated simultaneously, undesired thermal distortion due to asymmetrical heat input can be counteracted in particular.

High processing efficiency can also be achieved by at least two workpieces being arranged in the working space and each being coated simultaneously using at least one deposition apparatus. As a result, it is possible to process a plurality of workpieces in parallel in a working space of the coating device. When arranged horizontally, the workpieces both can be rotated about a vertical rotational axis and can be turned about a horizontal pivot axis.

The invention is explained in greater detail in the following on the basis of preferred embodiments shown schematically in the drawings, in which.

Figure 1:
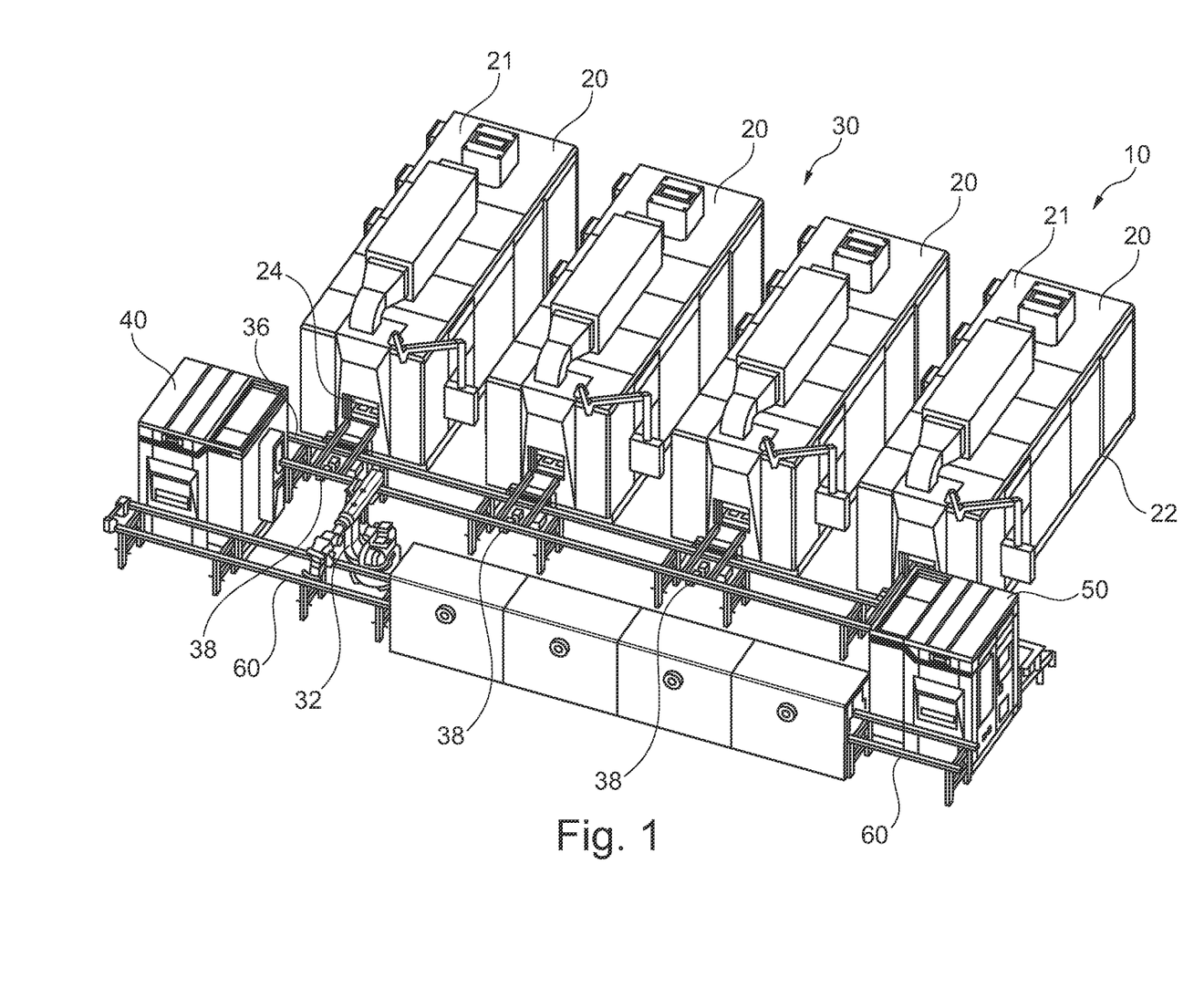
FIG. 1 is a schematic view of a system according to the invention comprising a module group.

A first embodiment of a system 10 according to the invention is shown in FIG. 1. Said system comprises four coating devices 20, which form a module group 30 in a parallel arrangement beside one another. An input measuring station 40 is arranged upstream of the module group 30, to which station workpieces (not shown here) are conveyed by means of a main conveying apparatus 60. By means of a handling apparatus 32, which is configured in the present embodiment as a multi-axis robot, the workpieces are picked up from the main conveying apparatus 60 and supplied to the box-shaped input measuring station 40.

The workpieces, in particular a surface to be coated, are measured in the input measuring station 40. In this process, a surface structure of the surface to be coated can in particular be detected, with peaks and troughs in the surface in particular being detected and measured.

The measured workpiece can then be transferred out of the input measuring station 40 via the handling apparatus 32, or directly out of the input measuring station 40, to a linear conveying apparatus 36 which runs along the coating devices 20. A supply apparatus 38 is arranged on the conveying apparatus 36, designed as a linear conveyor, upstream of each coating device 20, by means of which supply apparatus a workpiece is introduced into a working space 23 of a box-shaped housing 21 of the selected coating device 20 through an inlet opening 24.

The coating devices 20 are designed to be the same or substantially the same and comprise a transport frame 22. With this transport frame 22, the coating devices 20 can be moved and relocated by means of an indoor crane or forklift truck. This makes it possible, for example in the event of a capacity change, to add or remove additional coating devices 20 or to replace an existing coating device 20 with a new coating device 20 for repair or maintenance purposes.

In the coating device 20, at least one surface of the workpiece 5 is provided with a metal coating, as will be explained in greater detail in the following in conjunction with FIG. 2. After the coating, the workpiece 5 is guided back through the inlet opening 24 onto the conveying apparatus 36. This can also be carried out by the supply apparatus 38. By means of the conveying apparatus 36, the coated workpiece 5 is transported to a common output measuring station 50, in which the coated surface of the workpiece 5 is measured. After this final measurement in the output measuring station 50, the workpiece is placed back onto the main conveying apparatus 60, by means of which the workpiece 5 can be conveyed to further processing. The workpiece 5 can likewise be transferred from the conveying apparatus 36 into the output measuring station 50 and again to the main conveying apparatus 60 by a handling apparatus 32 in the same way as on the input measuring station 40, but this is not shown in FIG. 1.

The measured values determined in the input measuring station 40 for a specified workpiece 5 are transmitted to a central control apparatus. By means of the control apparatus, the conveying apparatus 36 is also controlled by the relevant supply apparatus 38 such that the measured workpiece 5 is guided to a specified coating device 20 in the module group 30. At the same time, the measured values for the specified workpiece 5 are forwarded to the selected or specified coating device 20 by the control apparatus, such that the workpiece 5 can be coated depending on the input measured values. After the coating, the workpiece is measured in the box-shaped output measuring station 50, the determined measured values likewise being forwarded to the central control apparatus and to the data set for the specified workpiece. A comparison of the input measured values and the output measured values as well as the coating parameters can be carried out in the control apparatus in order to determine whether said workpiece has been correctly coated. If necessary, operating parameters of a coating device 20 can be readjusted by the control apparatus during the coating.

Figure 2:
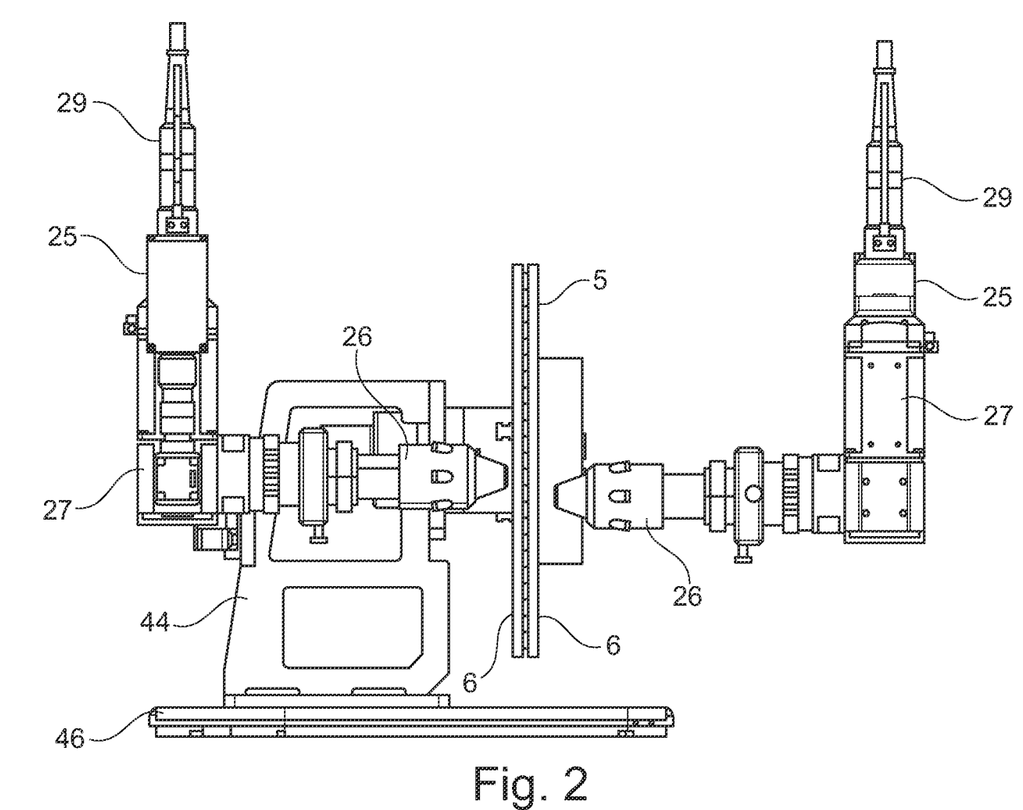
FIG. 2 is a schematic view of a first arrangement for coating a workpiece.

According to FIG. 2, a disc-shaped element can be provided as a workpiece 5 to be coated, in particular a brake disc having one or two workpiece surfaces 6 to be coated. The applying of the metal coating can be executed by a deposition nozzle 26 of a deposition apparatus 25 by means of laser deposition welding. The deposition nozzle 26 is arranged on a carrier 27. In deposition welding, coating material, in particular a metal powder, is initially applied and then locally melted by means of a laser. In the process, the coating can be carried out in multiple steps and multiple layers. In particular, the layers can also be applied with different layer thicknesses, different materials and different methods in order to achieve desired properties, in particular in regard to adhesion, abrasion resistance and/or corrosion resistance. The laser of the deposition apparatus 25 can be arranged in the region of the deposition nozzle 26.

According to the invention, it is possible to carry out the coating using two or more deposition apparatuses 25, the deposition nozzles 26 each being moved by means of a carrier 27 along the workpiece surfaces 6 to be coated by means of a movement apparatus 29, for example by linear motors. In the laser deposition welding according to FIG. 2, two coating apparatuses 25 are arranged opposite one another, with opposite sides of a vertically arranged workpiece 5 being coated simultaneously. In the process, the workpiece 5 is rotatably retained on a transport pallet 46 on a retaining apparatus 44.

Figure 3:
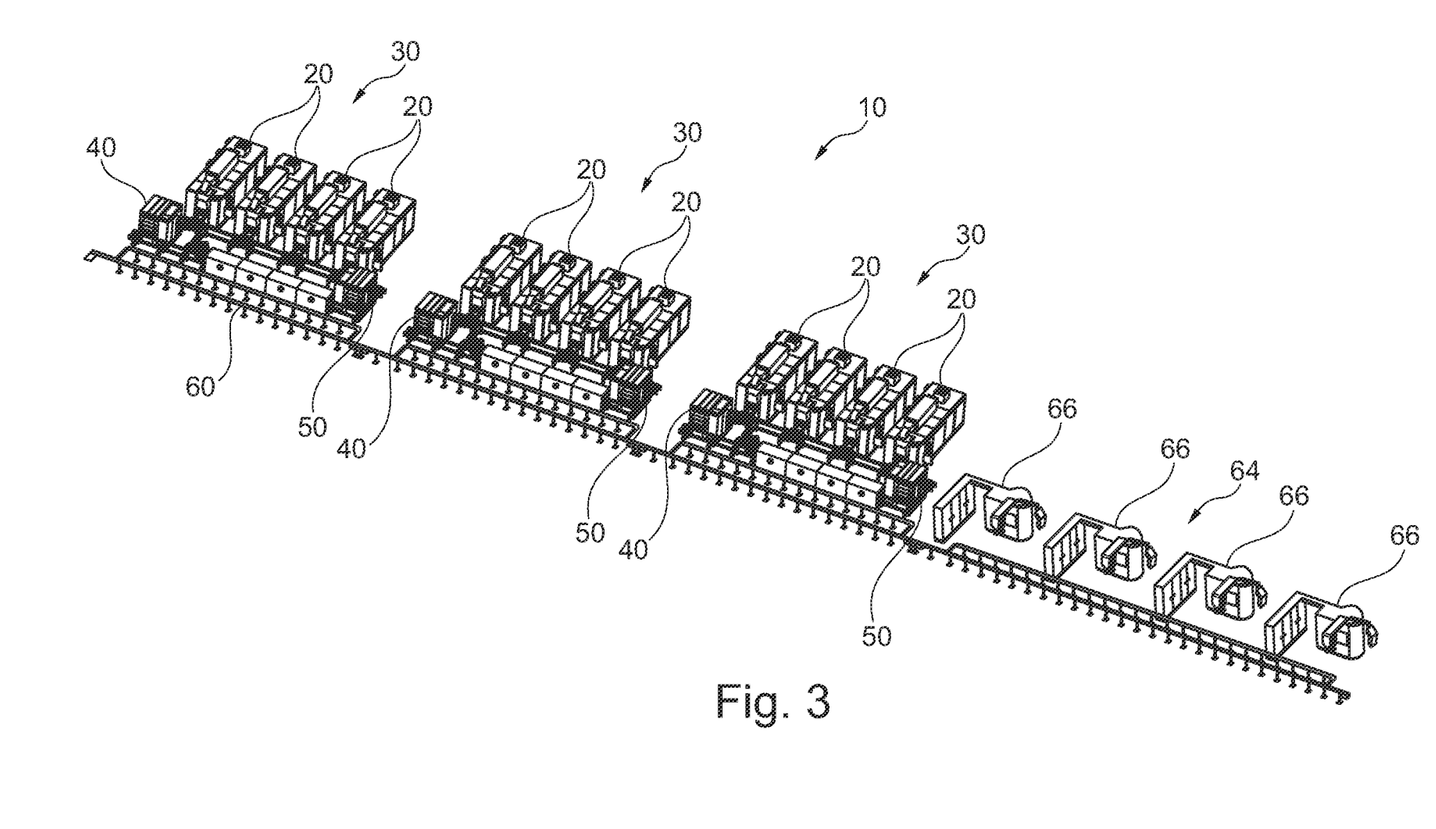
FIG. 3 is a perspective view of another system according to the invention comprising a plurality of module groups according to FIG. 1.

A development of a system 10 according to the invention comprising a total of three module groups 30, which are each made up of four coating devices 20, is shown in FIG. 3. Here, the individual module groups 30 are designed according to the embodiment in FIG. 1, with an input measuring station 40 and an output measuring station 50 being assigned in each module group 30.

The total of three module groups 30 are arranged along a linear main conveying apparatus 60, such that, in this parallel arrangement, a processing of the workpieces can be executed in parallel in the individual module groups 30 and in the individual processing devices 20. After passing through the respective output measuring station 50, a workpiece which has finished being coated is guided back to the main conveying apparatus 60, by means of which the workpiece is fed to a post-processing station 64.

In the embodiment shown according to FIG. 3, the post-processing station 64 comprises a total of four grinding devices 66 arranged in parallel. By means of the grinding devices 66, the at least one coated surface of the workpiece can be finally processed and ground. In order to ensure efficient post-processing, the detected measured values for each workpiece can be forwarded to the specified grinding device 66 in the post-processing station 64 which has been selected by the control apparatus for processing the workpiece. Depending on the detected final height of the coated surface of the workpiece, for example, an advancing of the grinding tool can thus be efficiently executed towards the workpiece in the respective grinding device 66.

It can be seen in particular from the exemplary embodiment according to FIG. 3 that even for large increases in capacity that are potentially required, not only individual coating modules 20 but whole module groups 30 which each comprise a plurality of coating modules 20 and associated input measuring stations 40 and output measuring stations 50 can be readily added to a complete system.

Figure 4:
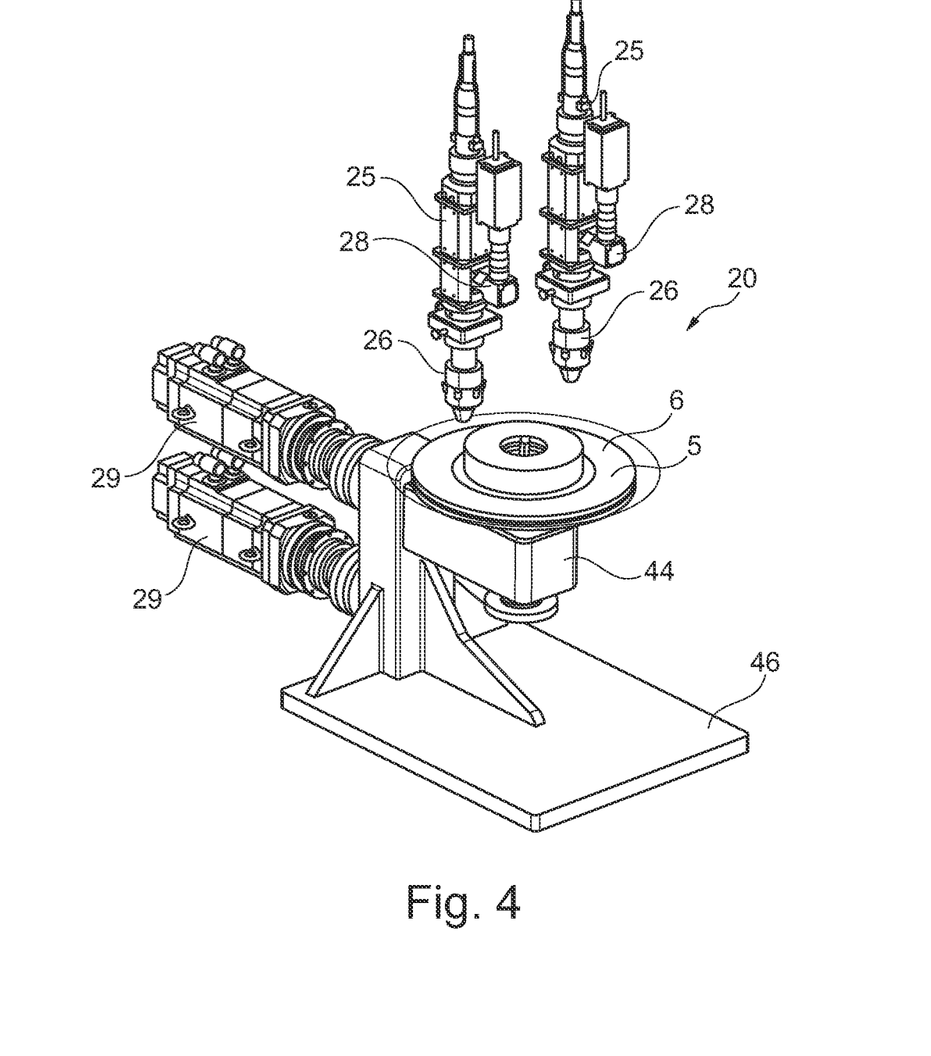
FIG. 4 is a perspective view of a second arrangement for coating.

Another coating device 20 according to the invention is shown in FIG. 4. In this coating device 20, the workpiece 5 is rotatably arranged on a transport pallet 46 on a retaining apparatus 44, such that the annular workpiece surface 6 to be coated is directed horizontally. By means of a movement apparatus 29 which in particular comprises rotary motors and linear motors, the workpiece 5 can be set in a rotary movement and in a radially directed linear movement on the retaining apparatus 44. Two deposition apparatuses 25 which each comprise a deposition nozzle 26 and a laser 28 are arranged above the workpiece surface 6 to be coated. The deposition apparatuses 25 can be adjusted vertically relative to the workpiece 5 and, where necessary, also in a horizontal plane. In this coating device 20, the workpiece 5 can be coated by the two deposition apparatuses 25 simultaneously.

Figure 5:
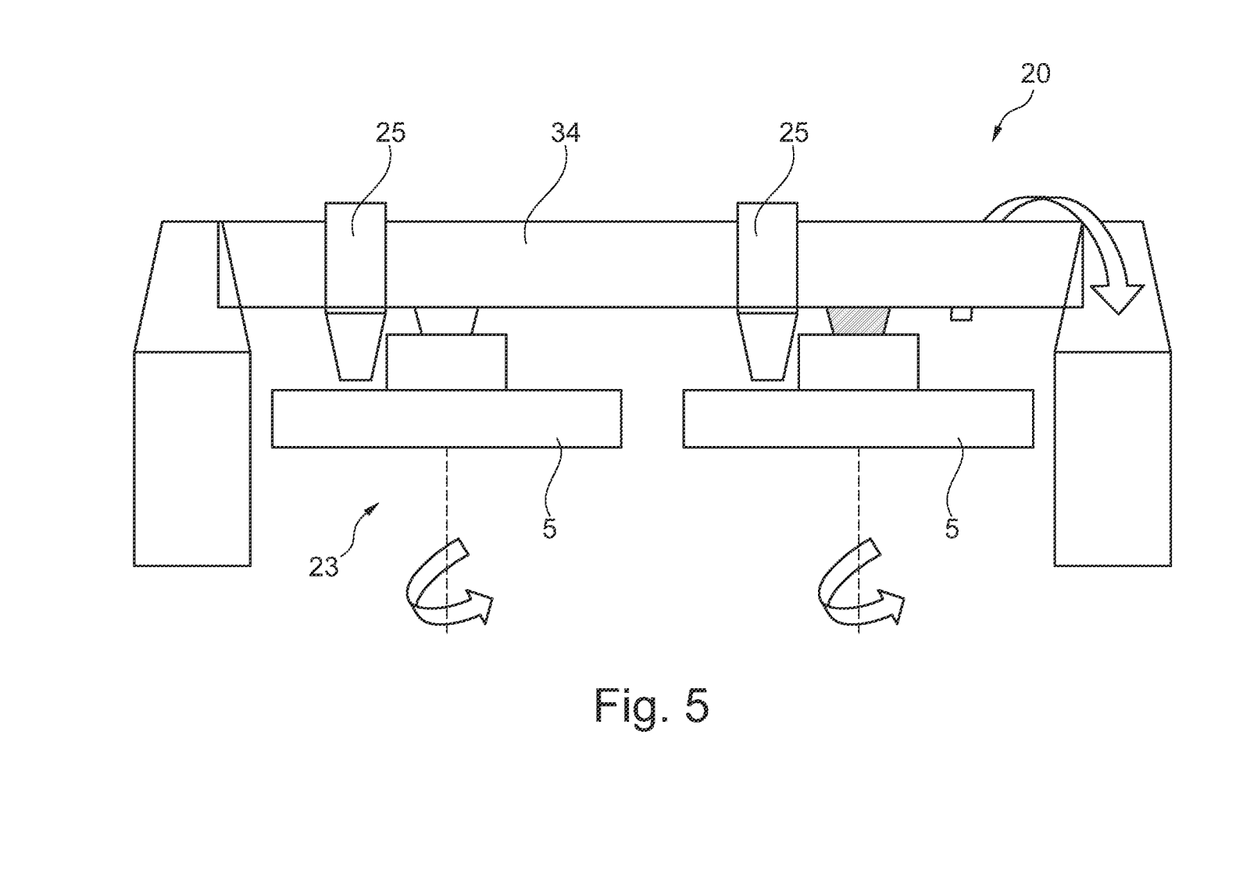
FIG. 5 is a schematic view of a third arrangement for coating.

According to FIG. 5, another variant of the arrangement of a coating device 20 according to the invention is shown. In this coating device 20, two workpieces 5 are located in a working space 23 simultaneously. In the process, the preferably rotationally symmetrical workpieces 5 are arranged so as to be rotatable about a vertical rotational axis, the rotational axes each being directed in parallel with one another. The workpieces 5 are each provided with a coating by one deposition apparatus 25. The deposition apparatuses 25 can be arranged on a common support 34, along which a linear movement of the deposition apparatuses 25 can be carried out. The support 34 may also be provided for simultaneously retaining and bracing the workpieces 6 in the working position, with the support 34 itself being adjustable, in particular pivotable, as indicated by an arrow.

Figure 6:
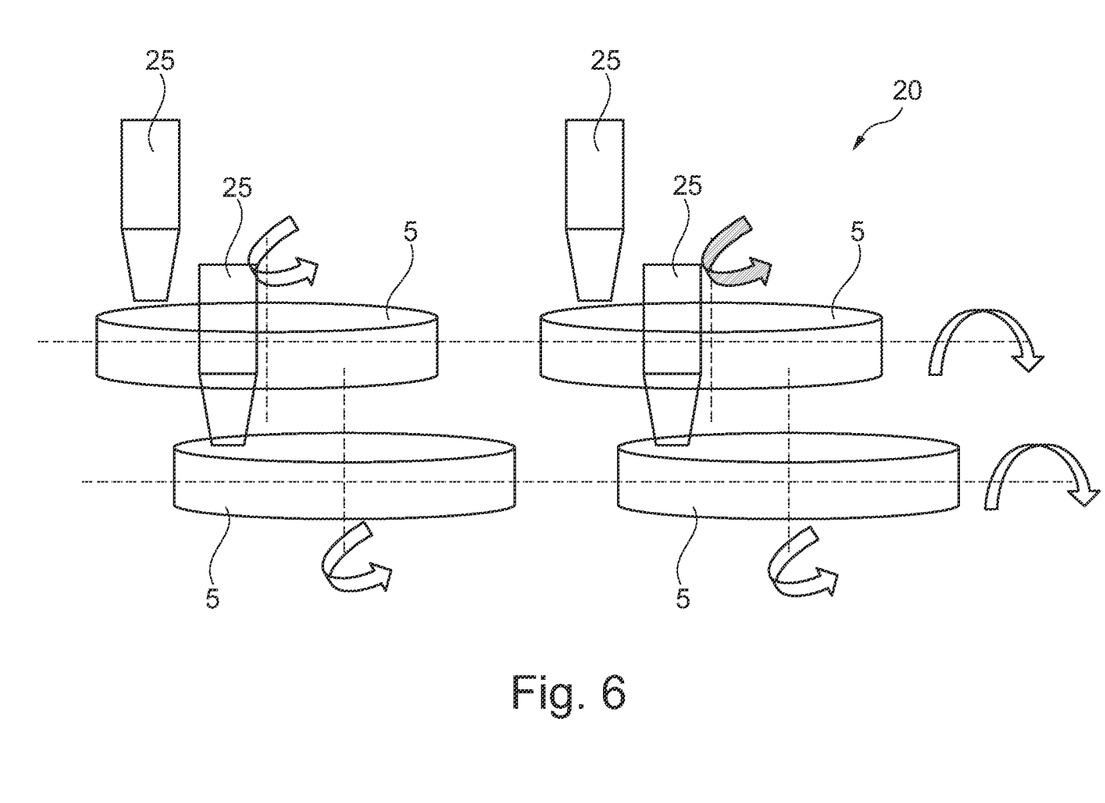
FIG. 6 is a schematic view of a fourth arrangement for coating.

According to FIG. 6, another coating device 20 according to the invention is schematically shown, in which four workpieces are simultaneously arranged in a working space of the coating device 20. Here, the workpieces 5 are each rotatably mounted about a vertical rotational axis in a horizontal arrangement so as to be directed in parallel with one another. Each workpiece 5 can be coated by means of a separate coating device 25.

In order to carry out coating on both sides, the workpieces 5 can each be pivoted about a horizontal pivot axis in a common or separate movement, such that an opposite horizontal surface of the workpiece 5 can be coated.

The invention claimed is:

1. A coating device for metal-coating of workpieces (5), comprising
    a housing (21), which surrounds a working space (23),
    a retaining apparatus (44) for retaining at least one workpiece (5) in the working space (23),
    two deposition apparatuses (25), each comprising a deposition nozzle (26) for applying a metal powder to a workpiece surface (6) to be coated, and a laser for locally melting the metal powder on the workpiece surface (6) to form a coating, and
    at least one movement apparatus (29) for moving the two deposition apparatuses relative to the workpiece surface (6) during the coating,
    wherein the two deposition apparatuses (25) are arranged in the working space (23) of the housing (21), the two deposition apparatuses being designed to simultaneously apply and melt the metal powder,
    wherein the two deposition apparatuses (25) are located opposite each other offset by 180 degrees about a center axis of the at least one workpiece (5) such that the nozzles (26) of the two deposition apparatuses (25) face each other for coating the at least one workpiece (5) on two disc-shaped or planar opposite workpiece surfaces (6),
    wherein the at least one workpiece (5) is rotatably mounted on the retaining apparatus (44),
    wherein each deposition apparatus (25) is movable relative to the workpiece surface (6) by the at least one movement apparatus (29) during coating, and
    wherein the at least one movement apparatus (29) is disposed in part on the retaining apparatus (44) and has a motor for moving the at least one workpiece (5) during coating.

2. The coating device according to claim 1, characterised in that
    the workpiece surface (6) to be coated is arranged horizontally.

3. The coating device according to claim 1, characterised in that
    the workpiece surface (6) to be coated is arranged vertically.

4. The coating device according to claim 1, characterised in that
    the deposition apparatuses (25) are directly opposite one another and the coating can be carried out on both sides simultaneously.

5. The coating device according to claim 1, characterised in that at least two workpieces (5) are arranged in the working space (23) and can be coated simultaneously by the deposition apparatuses (25).

6. The coating device according to claim 1, characterised in that the workpiece surfaces (6) to be coated are annular.

\* \* \* \* \*